(12) United States Patent
Karame et al.

(10) Patent No.: US 12,093,908 B2
(45) Date of Patent: Sep. 17, 2024

(54) SYSTEM AND METHOD FOR SECURE TRANSACTION VERIFICATION IN A DISTRIBUTED LEDGER SYSTEM

(71) Applicant: NEC Laboratories Europe GmbH, Heidelberg (DE)

(72) Inventors: Ghassan Karame, Heidelberg (DE); Jens-Matthias Bohli, Leimen (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 984 days.

(21) Appl. No.: 15/928,119

(22) Filed: Mar. 22, 2018

(65) Prior Publication Data

US 2019/0295049 A1   Sep. 26, 2019

(51) Int. Cl.
*G06Q 20/06*   (2012.01)
*G06Q 20/02*   (2012.01)
*G06Q 20/36*   (2012.01)
*G06Q 20/38*   (2012.01)
(Continued)

(52) U.S. Cl.
CPC ......... *G06Q 20/0658* (2013.01); *G06Q 20/02* (2013.01); *G06Q 20/3678* (2013.01); *G06Q 20/3823* (2013.01); *G06Q 20/3827* (2013.01); *G06Q 20/3829* (2013.01); *H04L 9/30* (2013.01); *H04L 9/3247* (2013.01); *G06Q 2220/00* (2013.01)

(58) Field of Classification Search
CPC ............... G06Q 20/0658; G06Q 20/02; G06Q 20/3678; G06Q 20/3827; G06Q 20/3823; G06Q 20/3829; G06Q 2220/00; H04L 9/3247; H04L 9/30
See application file for complete search history.

(56) References Cited

U.S. PATENT DOCUMENTS 9,998,438 B2 *  6/2018  Sinha ................... G06F 21/575
10,340,038 B2 *  7/2019  Witchey ................ G06Q 50/22
10,601,828 B2 *  3/2020  Avetisov ............... H04L 9/0838
(Continued)

FOREIGN PATENT DOCUMENTS

CN   107005574 A   8/2017
CN   107040585 A   8/2017
(Continued)

OTHER PUBLICATIONS

N. Bozic, G. Pujolle and S. Secci, "A tutorial on blockchain and applications to secure network control-planes," 2016 3rd Smart Cloud Networks & Systems (SCNS), 2016, pp. 1-8, doi: 10.1109/SCNS.2016.7870552. (Year: 2016).*
(Continued)

*Primary Examiner* — Neha Patel
*Assistant Examiner* — Jahed Ali
(74) *Attorney, Agent, or Firm* — Leydig, Voit & Mayer, Ltd.

(57) ABSTRACT

A method for validating a transaction transmitted on a distributed ledger system network includes receiving, by a first node of the distributed ledger system network, verification data associated with the transaction from a second node of the distributed ledger system network. The verification data includes a digital signature generated in a secure enclave of the second node. The first node integrates the verification data into a distributed ledger of the distributed ledger system network.

12 Claims, 7 Drawing Sheets

(51) Int. Cl.
H04L 9/30 (2006.01)
H04L 9/32 (2006.01)

(56) References Cited

U.S. PATENT DOCUMENTS

| | | | | |
|---|---|---|---|---|
| 2002/0107804 | A1* | 8/2002 | Kravitz | H04L 9/3228 705/51 |
| 2003/0070080 | A1* | 4/2003 | Rosen | G06Q 20/06 713/187 |
| 2013/0055369 | A1* | 2/2013 | Kumar | H04L 9/3247 726/7 |
| 2014/0108805 | A1* | 4/2014 | Smith | G06F 21/126 713/171 |
| 2015/0072726 | A1* | 3/2015 | Stern | G06F 21/575 455/552.1 |
| 2015/0120567 | A1* | 4/2015 | Van Rooyen | G06F 21/10 705/59 |
| 2015/0287026 | A1* | 10/2015 | Yang | G06Q 20/06 705/69 |
| 2015/0332283 | A1* | 11/2015 | Witchey | G06Q 50/22 705/3 |
| 2015/0347768 | A1* | 12/2015 | Martin | G06F 21/10 726/1 |
| 2016/0086175 | A1* | 3/2016 | Finlow-Bates | H04L 63/061 705/77 |
| 2016/0234176 | A1* | 8/2016 | Chu | H04L 63/06 |
| 2016/0254904 | A1* | 9/2016 | Hjelm | H04L 9/006 713/155 |
| 2016/0254918 | A1* | 9/2016 | Liu | H04L 9/3268 713/156 |
| 2016/0275461 | A1* | 9/2016 | Sprague | G06Q 20/0655 |
| 2016/0379212 | A1* | 12/2016 | Bowman | H04L 9/3239 705/71 |
| 2017/0005804 | A1* | 1/2017 | Zinder | G06F 21/6254 |
| 2017/0091434 | A1* | 3/2017 | Proulx | G06F 21/57 |
| 2017/0091467 | A1 | 3/2017 | Pogorelik et al. | |
| 2017/0243212 | A1* | 8/2017 | Castinado | H04L 9/3236 |
| 2017/0316409 | A1 | 11/2017 | Smith et al. | |
| 2018/0109541 | A1* | 4/2018 | Gleichauf | H04L 67/1097 |
| 2018/0139042 | A1* | 5/2018 | Binning | H04L 9/3297 |
| 2018/0145836 | A1* | 5/2018 | Saur | G06Q 20/3829 |
| 2018/0167212 | A1* | 6/2018 | Walrant | H04L 63/101 |
| 2018/0240114 | A1 | 8/2018 | Li | |
| 2018/0276668 | A1 | 9/2018 | Li | |
| 2019/0013943 | A1* | 1/2019 | Maim | G09C 1/00 |
| 2019/0043024 | A1* | 2/2019 | Lancashire | G06Q 20/223 |
| 2019/0173667 | A1 | 6/2019 | Wang et al. | |
| 2019/0208414 | A1* | 7/2019 | Roennow | H04W 80/02 |
| 2019/0267119 | A1* | 8/2019 | Witchey | H04W 12/02 |
| 2019/0312734 | A1* | 10/2019 | Wentz | H04L 9/3247 |
| 2019/0318816 | A1* | 10/2019 | Witchey | G16H 10/60 |
| 2020/0021439 | A1* | 1/2020 | Sato | G06Q 20/401 |
| 2020/0145231 | A1* | 5/2020 | Trevethan | H04L 9/3239 |
| 2020/0184489 | A1* | 6/2020 | Negi | G06F 16/258 |
| 2020/0186360 | A1* | 6/2020 | Chan | G06Q 20/02 |
| 2020/0278963 | A1* | 9/2020 | Destefanis | H04L 67/1093 |

FOREIGN PATENT DOCUMENTS

| | | | |
|---|---|---|---|
| CN | 107196900 A | 9/2017 | |
| WO | WO-2005038634 A2 * | 4/2005 | G06F 21/33 |
| WO | 2016209569 A1 | 12/2016 | |
| WO | 2017122187 A2 | 7/2017 | |
| WO | 2017203093 A1 | 11/2017 | |

OTHER PUBLICATIONS

Wenting Li, et al., "Securing Proof-of-Stake Blockchain Protocols", Data Privacy Management, Cryptocurrencies and Blockchain Technology, pp. 297-315, Sep. 13, 2017.

Frederik Armknecht, et al., "Sharding PoW-based Blockchains via Proofs of Knowledge", IACR Cryptology ePrint Archive, pp. 1-16, Dec. 2017.

Fan Zhang et al: "REM: Resource-Efficient Mining for Blockchains", International Association for Cryptologic Research,, vol. 20170306:192419,, Feb. 23, 2017 (Feb. 23, 2017), pp. 1-27, XP061022872.

Joshua Lind et al: Teechain: Scalable Blockchain Payments using Trusted Execution Environments, arxiv.org, Cornell University Library, 201 Olin Library Cornell University Ithaca, Ny 14853, Jul. 18, 2017 (Jul. 17, 2017), XP080996605.

Joshua Lind et al: "Teechain Scalable Blockchain Payments using Trusted Execution Environments", arxiv.org, Cornell University Library, 201 Olin Library Cornell University Ithaca, NY 14853, Jul. 18, 2017 (Jul. 18, 2017), XP080777484.

Park, Jaemin et al.; "TM-Coin: Trustworthy Management of TCB Measurements in IoT"; $2^{nd}$ IEEE PERCOM Workshop on Security Privacy and Trust in The Internet of Things 2017; Mar. 13, 2017; pp. 654-659; XP033092364; IEEE; Piscataway, NJ, USA.

* cited by examiner

SYSTEM AND METHOD FOR SECURE TRANSACTION VERIFICATION IN A DISTRIBUTED LEDGER SYSTEM

FIELD

The present invention relates to a system and method for robust and secure verification of transactions in a distributed ledger system.

BACKGROUND

Distributed ledger (DL) systems are a type of distributed database management system that allow for data (e.g., transactions, metadata, etc.) to be recorded, shared, and synchronized across a distributed network of different network participants (e.g., nodes). A blockchain is particular type of data structure used in some DL systems that facilitates the storage and distribution of data in packages called "blocks" that are digitally connected to each other in a "chain." Blockchain technology provides a decentralized, open, Byzantine fault-tolerant transaction mechanism.

DL systems, particularly those using blockchain technology, are becoming common for various types of Internet interactions, including anonymous online payments, remittance, and the transaction of digital assets (e.g., digital currencies). Cryptocurrencies (a type of digital currency), such as Bitcoin, Litecoin, Dogecoin, and Ethereum, are well-recognized examples of DL systems implemented with blockchain technology.

In spite of much skepticism, cryptocurrencies have experienced significant attention and market adoption, with Bitcoin in particular garnering the widest adoption and attention compared to other cryptocurrencies proposed to date. Indeed, Bitcoin currently holds the largest market share among existing cryptocurrencies, with a market capitalization in the tens of billions of U.S. dollars. Bitcoin's exchange rate also recently sharply rose over most fiat currencies with significant additional rise expected in the coming few years. One of the (many) reasons that led to the sustainability of the Bitcoin system was the large investments made by several mainstream companies in large data centers that are equipped with dedicated Proof of Work (PoW) mining capabilities.

PoW is a technique used to establish consensus in DL systems. For example, in some blockchain systems (e.g., Bitcoin, Litecoin, Dogecoin, and Ethereum), in order to add a new block to the chain (i.e., a new set of transactions to the ledger), a PoW is required. A PoW is a computational challenge that is hard to solve (in terms of computing power and processing time) but easy to verify. In some DL systems, the process of generating the PoW is called "mining."

In some DL systems, the PoW is generated by repeatedly running one-way cryptographic hashing algorithms until a string of numbers that satisfies a predefined but arbitrary condition is produced. Specifically, the Bitcoin blockchain system uses the SHA-256 hash algorithm and the predefined condition is for a certain number of leading zeros.

By way of illustration, in some blockchain systems, the process of mining for a given set of transactions T and given the hash Bl of the previous block at a certain point in time t requires determining a nonce value NONCE using a hash function H( ), such that H(Bl; T; t; NONCE) fulfills a predefined condition. As observed above, in Bitcoin, the predefined condition is that the PoW generated has a predefined number of leading zeroes. That is, the Bitcoin protocol requires that a compliant PoW result be smaller than a given difficulty threshold D, i.e., H(Bl; T; t; NONCE) <D.

Solving this PoW puzzle is a computationally difficult process and there are no known shortcuts, which means that any single node in the network only has a diminutively small chance of generating the required PoW without expending a vast amount of costly computing resources. The Bitcoin system is calibrated such that a valid PoW is expected to be produced around every 10 minutes, and in case two are created at exactly the same time, the PoW with the higher difficulty score is accepted as valid. In some DL systems, each "miner" that produces a valid PoW receives a reward (e.g., cryptocurrency or waiver of transaction fees), which serves as an economic incentive to maintain system integrity.

The current difficulty level of PoW mining (particularly for Bitcoin) is so prohibitively high that it reduces the incentives for miners to operate solo. Accordingly, joining a mining pool is an attractive option to receive a portion of the block reward on a consistent basis. Rewards are then shared between members of the mining pools, so called workers, based on the computational resources that they commit. There are currently a number of models for profit sharing in mining pools, such as pay-per-share (PPS), pay-per-last-n-shares (PPLNS), among others. In these models, workers do not directly connect to the blockchain; instead, they are typically required to solve a PoW with a reduced difficulty that is determined by the pool operator. The pool operator will then add the new block to the blockchain.

In spite of their significant energy consumption and low performance, PoW based cryptocurrencies currently account for more than 90% of the total market capitalization of existing digital cryptocurrencies. This is probably due (at least in part) to the considerable investments that have been carried out in hash-based mining dedicated machinery.

SUMMARY

In an embodiment, the present invention provides a method for validating a transaction transmitted on a distributed ledger system network. The method includes a first node of the distributed ledger system network receiving verification data associated with the transaction from a second node of the distributed ledger system network, the verification data including a digital signature generated in a secure enclave of the second node. The first node integrates the verification data into a distributed ledger of the distributed ledger system network.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
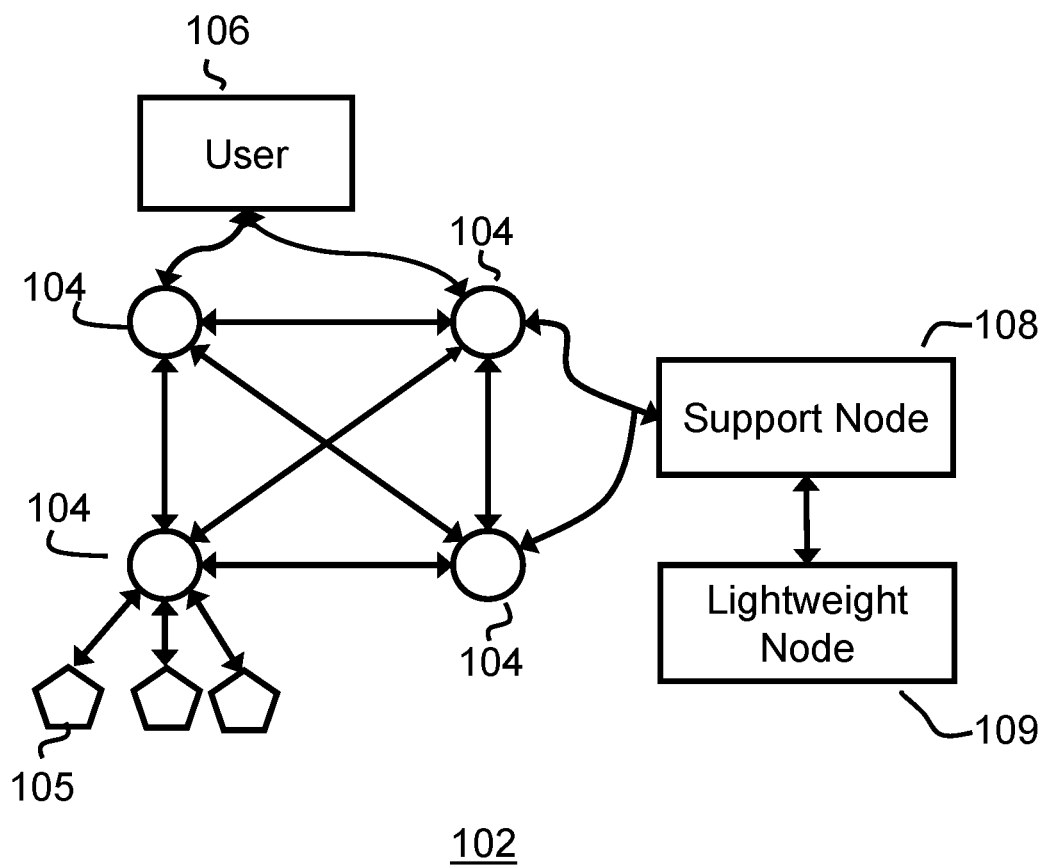
FIG. 1 illustrates a DL system including full nodes, worker nodes, a support node and a lightweight node according to an embodiment.

Significant cost (e.g., energy, computational, and time costs) associated with operating PoW based DL systems (particularly blockchains systems), among other considerations, can lead to a prevalence of mining pools and a sub-optimal number of full nodes active in the DL system. This in-turn can create problems unique to DL systems, namely a sub-optimal system for verifying the DL (e.g., the blockchain), which threatens the security and sustainability of the DL system. These problems (among others) are solved by embodiments of the present invention, which provides secure and robust systems and methods for validating a DL transaction in a DL system.

To illustrate certain aspects of these unique problems, consider Bitcoin. As discussed above, the current difficulty level of PoW blockchain mining for Bitcoin has created a cost/benefit environment that discourages blockchain miners from operating solo (e.g., operating as full nodes) and has encouraged joining a mining pool or otherwise operating a light-weight node (i.e., a node that is performs fewer than all functions of a full node).

Although profitable, mining pools offer a departure from the original model outlined in Nakamoto, S. Bitcoin: A Peer-to-Peer Electronic Cash System (October 2008, Bitcoin.org), the entirety of which is hereby incorporated by reference herein. While mining a new block, the miner is incentivized to integrate the available transactions into the new block. With the number of transactions that are in the block, the reward that is paid to the successful miner grows. Also, in order to mitigate the risk that a mined block is invalid, all transactions should be verified for validity before integration into the block. However, in a mining pool, solely the mining pool operator acts as a full node (and verifies the blockchain) while the workers only obtain computing tasks in order to mine a new block.

Under this scenario, workers (or other nodes not mining) do not have much incentive to verify the blockchain thereby causing a sharp decrease in the number of nodes that verify the full blockchain and a considerable surge in the number of workers and lightweight blockchain clients (which may only store or verify a small subset of transactions). Given that trusted data storage and processing is a primary service provided by a blockchain, a lack of verification of the blockchain is highly alarming and a serious threat to the security and sustainability of the blockchain system. Blockchain data could be irreparably corrupted by Byzantine failures caused by accidents or targeted attacks. Also, in the current systems, the blockchain data cannot be verified with a high redundancy and is susceptible to errors and corruption by the operators who control the blockchain data.

Embodiments of the present invention address the above-described problems (as well as others) in DL systems (and particularly blockchain systems with PoW implementations). For example, some embodiments separate the roles of block computation and verification and allow new nodes to get rewards (e.g., a digital asset or fee credit) in exchange for their verification work. Some embodiments distribute rewards to incentivize participation as a verification node. Some embodiments also provide systems where verification of transactions and/or computing a verification signature is executed within a secure enclave (e.g., a trusted execution environment). Some embodiments implement a mechanism for selecting as a preferred branch in a blockchain the branch with the most verifications. Each of these novel features of the described embodiments contribute to providing a secure and robust DL system.

Embodiments can be integrated in existing DL systems (e.g., blockchain systems) or be used as a basis for building new DL systems. Additionally, embodiments can also implement all or any combination of the features discussed herein.

FIG. 1 illustrates a DL system 102 according to an embodiment. A DL system may include a peer-to-peer network of interconnected nodes. For example, the DL system 102 may include one or more DL nodes, such as full nodes 104. The full nodes 104 may build, maintain, and distribute a replicated ledger of an ordered sequence of transaction records (i.e., the DL). A specific consensus protocol may be executed by the full nodes 104 to ensure consistency, reliability and integrity of the ledger as new transactions are appended to it.

In addition to the full nodes 104, DL systems according to some embodiments, may include additional DL nodes, such one or more workers 105, users 106, support nodes 108, and lightweight nodes 109. The interconnection of the DL nodes provides a DL network. A DL network may be implemented using various network technologies, including the Internet and local area networks (LANs). The DL nodes, for example the full nodes 104, workers 105, users 106, support nodes 108, and lightweight nodes 109, transmit and receive DL data over the DL network. In some embodiments, different types of DL data propagate though the system in different ways. For example, the replicated ledger may be broadcast to all full nodes 104, or the users 106 may only transmit to a select number of full nodes 104, which may in turn rebroadcast the received information to the remaining full nodes 104.

In some embodiments, the workers 105 each communicate directly with a full node 104. Depending on the implementation, the workers 105 may not directly send or receive data with the remainder of the DL system. Workers 105 may undertake tasks assigned by their associated full node 104. For example, in an embodiment where the full node 104 that is a parent node to the workers 105 is operating as a mining pool operator, the workers 105 may be assigned simplified tasks that contribute to executing the consensus protocol of the DL system (e.g., contribute to the PoW). Here, the workers 105 are operating in a mining pool. In some embodiments, upon successful completion of a consensus protocol task, the workers 105 in the mining pool share in a reward.

The users 106 may be DL clients that provide new data proposed for incorporation into the DL. According to some embodiments, the users 106 execute less than the entire DL protocol. For example, the DL users may only propose transactions for incorporation into the DL, but may not build or maintain the DL.

In some embodiments, lightweight nodes 109 may have restricted processing resources and may not fully participate in a DL consensus protocol process, but may be available to contribute to the consensus protocol process or to propose new transactions for incorporation in to the DL. Here, a support node 108 serves as an intermediary between a lightweight node 109 and the remainder of the DL system 102. In some embodiments, the support node 108 has sufficient processing resources to perform the consensus protocol.

Embodiments also provide a verification system within or supplementing the DL system. For example, distributed ledger systems may include one or more verifier nodes. In some embodiments, the verifier nodes verify one or more of the proposed data transmitted by the user 106 or the DL data. Depending on the embodiment, the verifier nodes may be implemented as one or more of the DL nodes 104, 105, 106, 108 and 109.

In some embodiments, one or more full nodes 104 perform the verifier function and are thus considered verifier nodes. In other embodiments, the verifier nodes may perform fewer functions as compared to full nodes 104. For example, the verifier node may be implemented as a user 106, performing the verifier function and broadcasting a proof of successful verification to the full nodes 104. Specifically a client node may, in addition to proposing transactions, also operate as verifier node. In another embodiment, a verifier node may be one of the worker nodes 105 that is assigned a verification task by its parent full node 104.

The DL system may be a blockchain system. In the blockchain system, the DL data includes blockchain data, the full nodes 104 include miners that build and maintain the blockchain, and the proposed data for incorporation into the blockchain includes transaction data provided by the users 106. In some embodiments, the blockchain system includes verifier nodes (for verifying the transactions and/or the blockchain data). Concepts described herein using an exemplary blockchain system should be understood to be equally applicable and readily adaptable to the general class of DL systems, particularly DL systems utilizing PoW technology.

Figure 2:
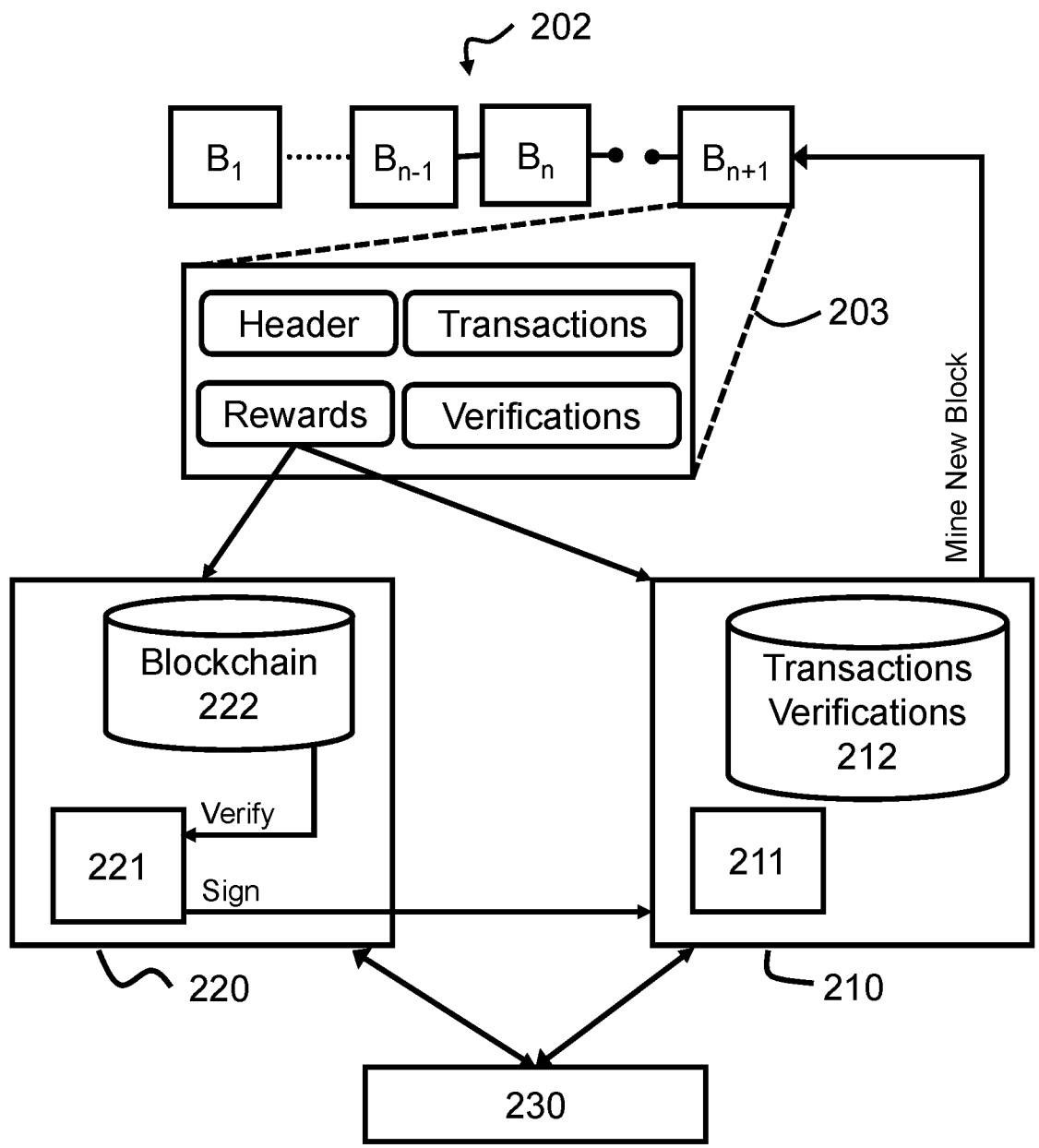
FIG. 2 illustrates a system for verifying blockchain data according to an embodiment.

FIG. 2 illustrates a system for verifying blockchain data according to an embodiment. The blockchain data includes a blockchain 202, which includes one or more blocks 203. Blocks 203, according to some embodiments, include a header, transaction data, verification data, or reward data. In some embodiments, a block (e.g., Bn) is extended by verifications of a predecessor block (Bn−1). Verifications may include, for example, signatures of a proceeding block header. In some embodiments, the signatures are arranged in a Merkle tree, and can include the Merkle root in a block header. In other embodiments, signatures are aggregated by a cryptographic scheme to obtain, for example, one value that can be included in the block header.

In some embodiments, the blockchain system includes one or more verifier nodes 220 for verifying the blockchain 202. The verifier node 220 may be a device such as computer, smart phone, or one or more processors configured to execute verification code. However, the verifier node is not so limited, and may for example be a virtual or distributed component of the blockchain system.

In some embodiments, the verifier node 220 holds (e.g., stores in memory 222) a copy of the blockchain (e.g. the full blockchain). The verifier node 220 verifies a block 203 in the blockchain 202. For example, the verifier node may verify the most recent known block Bn or a proposed block Bn+1.

When verifying a block 203, the verifier node 220 may verify the validity of all transactions in the block 203 according to a blockchain protocol. In some embodiments, this verification includes verifying the signature of a transaction sender (e.g., a client 106 who proposed a new transaction to be added to the blockchain 202), tracing the amount in the transaction back in order to confirm that the transaction sender has sufficient resources (e.g., funds), and/or that the transaction being verified has not been previously double-spent or used for another payment. In some embodiments, the verifier node 220 may also verify the validity of verifications that are already present in a block 203 (e.g., verification corresponding to an existing block (e.g., Bn) or verifications submitted by other verifier nodes 220). The verifier node 220 may also include a processor 221 configured to execute a verification application that performs one or more verification steps (such as those described herein).

In some embodiments, as a proof of successful verification the verifier node 220 signs a block header of a verified block 203 and broadcasts the signature through the blockchain system network.

Embodiments of the present invention also provide a mechanism is to integrate verifications into blocks 203. For example, a full node 210 (e.g., a miner) could integrate the signature received through the blockchain system network into the proposed block Bn+1. When multiple verifier nodes 220 are operating on the blockchain system network, multiple signatures may be transmitted and incorporated in to the proposed block Bn+1. In some embodiments, the full node 210 includes a processor 211 and memory 212. The full node 201 may execute a PoW application to append a new node Bn+1 to the blockchain 202.

As a block 203 includes more signatures signifying multiple successful verifications of the transactions incorporated therein, the security and robustness of the blockchain system improves. To increase verifications, embodiments provide for incentives to be given to the verifier nodes 220. In some embodiments, these incentives include participation in the reward given for block mining and/or transaction fee credits. Incentives, however, are no so limited and may include other rewards.

In some embodiments, the verifier nodes 220 share the portion of the reward payed out to the worker nodes 105 that contributed to the PoW.

Figure 3:
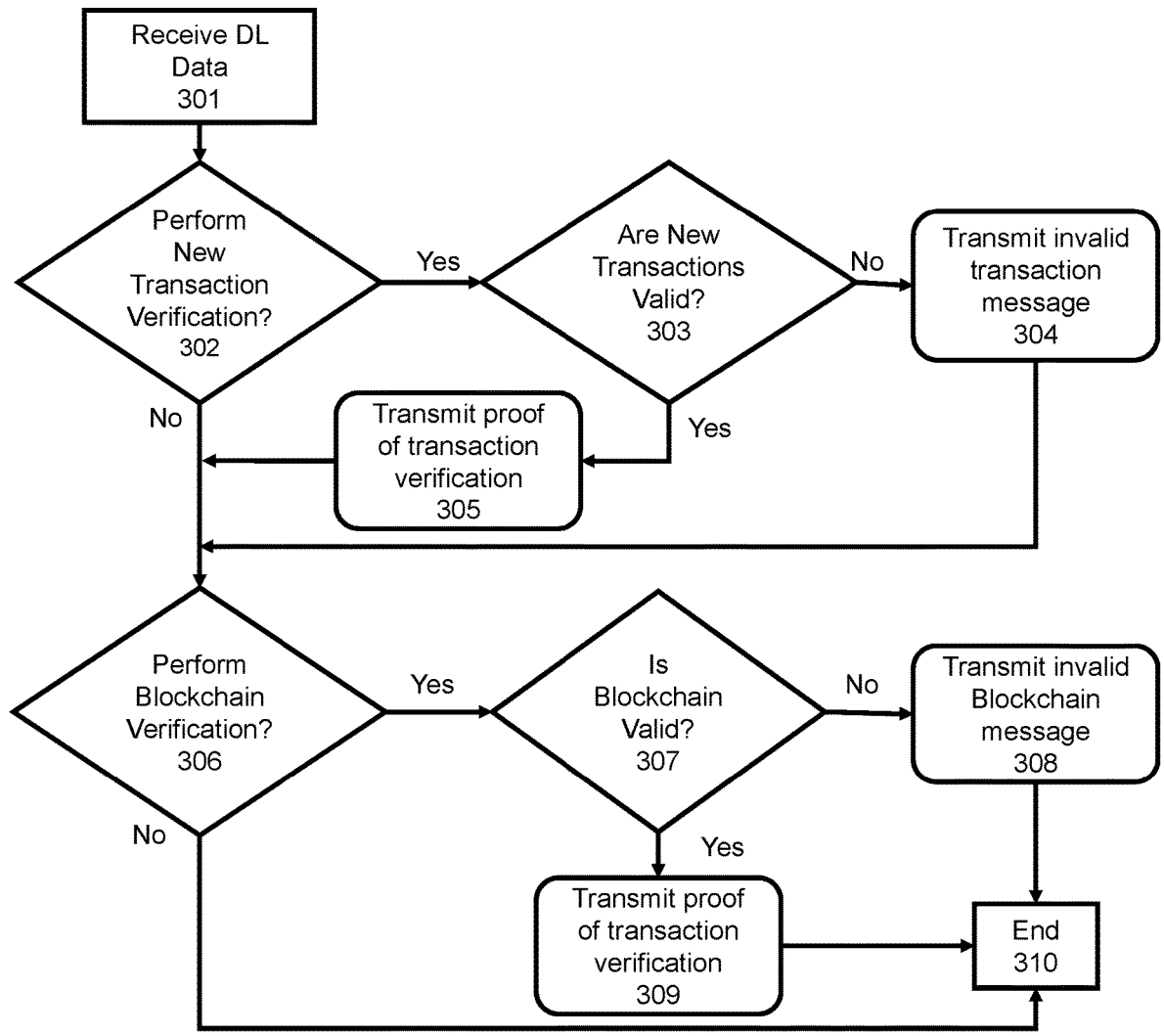
FIG. 3 illustrates a process for verifying DL data according to an embodiment.

FIG. 3 illustrates a process for verifying distributed ledger data according to an embodiment. In some embodiments, this process is performed by one or more DL nodes, preferably verifier nodes 220. In a preferred embodiment, instructions for the process are stored in memory 222 of each verifier node 220, the instructions being non-transitory and computer readable. The processor 221 of each verifier node 220 executes these instructions to perform the verification process.

At step 301, a DL node (preferably a verifier node 220) receives DL data. In some embodiments, the DL data is blockchain data, preferably including a proposed transaction for incorporation into a new block, and more preferably including the full blockchain (e.g., blockchain 202) and a proposed block (e.g., Bn+1). In some embodiments the proposed block includes one more proposed transactions and one or more prior verifications of the block.

At step 302, the DL node determines whether to perform a new transaction verification process. This determination may be made according to the protocols of a DL system or the operation mode of the DL node. In a preferred embodiment, the protocols of a DL system requires that a verifier node always performs the new transaction verification step after receiving DL data containing a new transaction. In another embodiment, a user operating the verifier node determines whether the verifier node will perform this step, and will indicate that determination by taking action (e.g., by pressing button or configuring a setting). If the DL node determines to perform the new transaction verification process, the DL node next executes step 303. Otherwise, the DL node next performs step 306.

At step 303, the DL node determines whether one or more of newly received transactions are valid. In a preferred embodiment, the DL node verifies all of the transactions proposed in the most recently proposed block. In some embodiments, the verification performed at step 303 includes checking the validity of all transactions in the block according to the blockchain protocol. The verification step performed at step 303 may include executing one or more of the following validation procedures for each transaction: verifying the signature of the transaction sender, tracing the amount in the transaction back to assert that the sender has enough funds, verifying that the transaction in question has not been previously double-spent or used for another payment. Alternatively, or in addition, the verification step performed at step 303 may include verifying prior verifications of the transactions (e.g., verification of the verifications that are in the block already).

Upon achieving a successful verification in step 303, the DL node transmits a proof of transaction verification in step 305. In a preferred embodiment, as proof of successful verification, the DL node signs the block header of the verified block and broadcasts the signature through the blockchain network. After transmitting the proof of transaction verification, the DL node executes step 306.

If a successful verification in step 303 is not achieved, in some embodiments the DL node executes step 304 and transmits a message indicating that one or more transactions are invalid. In other embodiments, step 304 is not executed, and instead upon failure to verify, the DL node moves to step 306 or ends 310 the verification process.

In step 306, the DL node determines whether to perform blockchain verification. This determination may be made according to the protocols of a DL system or the operation mode of the DL node. In a preferred embodiment, the protocols of a DL system requires that a verifier node always performs the verification of the blockchain after receiving a new blockchain. In another embodiment, a user operating the verifier node determines whether the verifier node will perform this step, and will indicate that determination by taking action (e.g., by pressing button or configuring a setting). If the DL node determines to perform the blockchain verification process, the DL node next executes step 307. Otherwise, the DL node ends 310 the verification process. In some embodiments, the verification process does not include steps 306-309.

In step 307, the DL node determines whether the blockchain is valid. In some embodiments, the DL node determines whether the full blockchain is valid, in other embodiments the DL node only determines whether one or more blocks are valid. The DL node determines the validity of a blockchain or a block according to the protocols of the DL system. For example, in one embodiment blocks in the blockchain can be validated by verifying the signatures in the block header. The blockchain may also be validated by validating a Merkle tree or Merkle branch.

Upon achieving a successful verification in step 373, the DL node transmits a proof of transaction verification in step 309. In a preferred embodiment, as proof of successful verification, the DL node signs the block header of at least one block and broadcasts the signature through the blockchain network. After transmitting the proof of transaction verification, the DL node ends 310 the verification process.

If a successful verification in step 307 is not achieved, in some embodiments the DL node executes step 308 and transmits a message indicating that blockchain contains one or more invalid blocks. In other embodiments, step 308 is not executed, and instead upon failure to verify, the DL node ends 310 the verification process.

Figure 4:
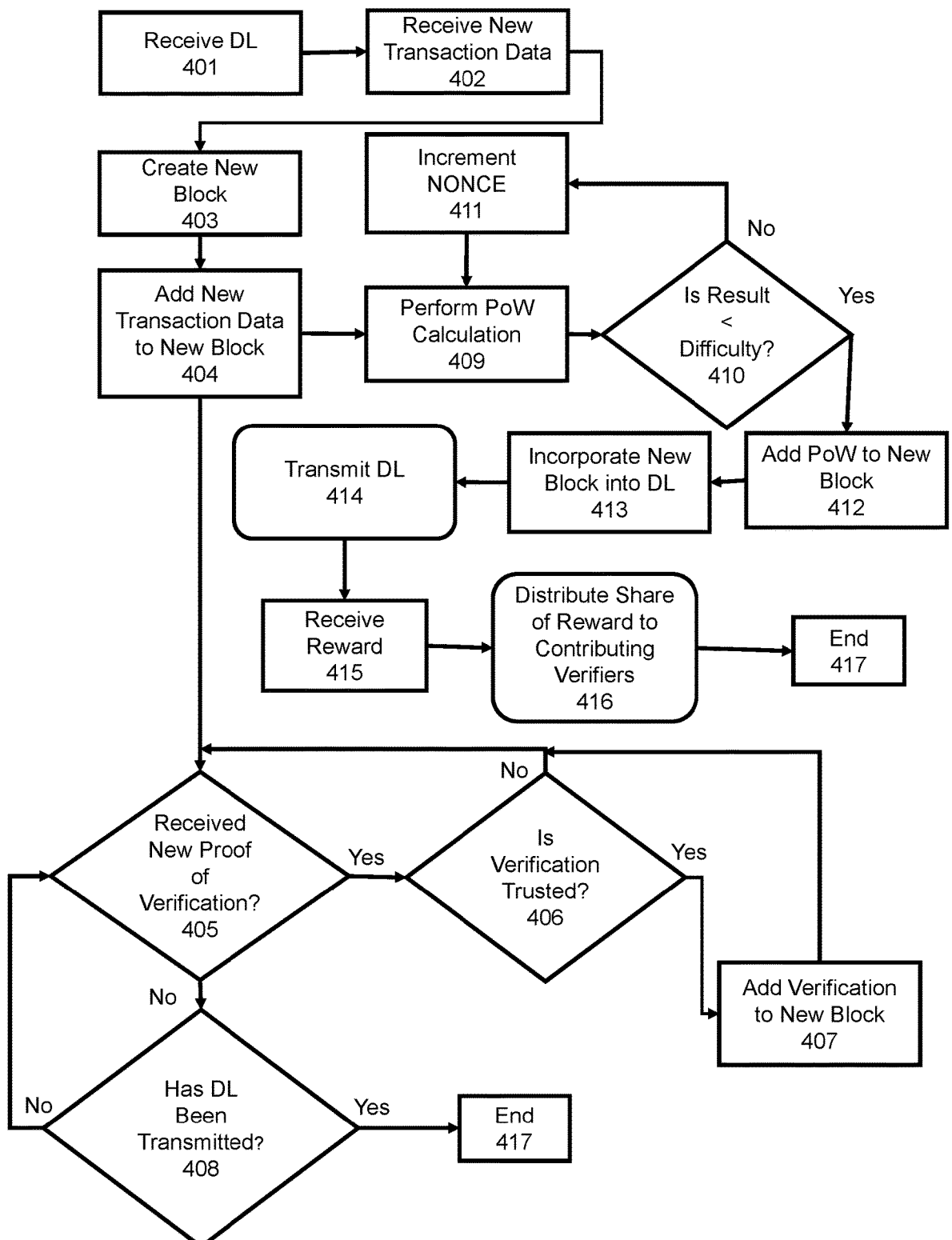
FIG. 4 illustrates a process for verifying DL data according to another embodiment.

FIG. 4 illustrates a process for verifying DL data according to another embodiment. In some embodiments, this process is performed by one or more DL nodes, preferably full nodes 210. In a preferred embodiment, instructions for the process are stored in memory 212 of each full node 210, the instructions being non-transitory and computer readable. The processor 211 of each full node 210 executes these instructions to perform the verification process.

At step 401, a DL node (preferably a full node 210) receives DL data. In some embodiments, the DL data includes the blockchain 202.

At step 402, the DL node receives new transaction data. In some embodiments, the new transaction data is one or more proposed transactions sent via the DL system by the user 106.

At step 403, the DL node creates a new block for incorporation into the DL data (e.g., added to the blockchain 202). At step 404, the DL node adds the new transaction data into the new block. After step 404, the method splits into two branches, with trunks at step 405 and 409. In some embodiments, these branches are performed simultaneously or concurrently. In other embodiments, the branch at 405 is performed upon an event occurring interrupting the branch at 409.

At step 405, the DL node checks to see whether it has received a new proof of verification. In some embodiments, the proof of verification is a signature sent by a verifier node 220. The proof of verification may have been generated according the process illustrated in FIG. 3 and transmitted upon the execution of steps 305 and/or 309. In some embodiments, step 405 may be implemented as an interrupt.

At step 406, the DL node determines whether the verification is trusted. According to some embodiments, the DL node determines whether the verification is trusted according to one or more of the following: the DL node recognizes the sender as a trusted sender, the verification includes a signature that corresponds to a public key in the DL nodes whitelist, or the DL node has been assured that the verification process was executed by a trusted application.

If the verification is trusted, the DL node adds the verification into the new block in step 407. If the verification is not trusted, the DL node discards the verification. Either way, the DL returns to step 405 to wait for another proof of verification.

If no proof of verification is received, in step 408 the DL node checks to see whether a new DL have been generated and transmitted by the DL node (e.g., whether a new block Bn+1 was successfully incorporated into the blockchain 202). If a new DL has been transmitted, the verification process proceeds to the end. Step 408 can be implemented as an interrupt.

In step 409, the DL performs PoW calculation. In a preferred embodiment, the PoW calculation includes a hashing algorithm H( ). The hashing algorithm H( ) may be SHA-256, or any other suitable hashing algorithm. The hashing algorithm H( ), may take as its inputs the new transaction data T, the hash B1 of the previous block at a certain point in time t, and a nonce value NONCE.

In step 410, the DL node checks whether the result of the PoW calculation is less than a difficulty value. If it is not, the DL increments the nonce value NONCE at step 411 and then performs the PoW calculation 409 with the new nonce value NONCE. In some embodiments, the DL node is a mining pool operator node and is assisted in calculating the PoW by one or more workers.

If the PoW is less than the difficulty value, the DL node goes to step 412 and may add the PoW to the new block. The DL node will then incorporate the new block into the DL in step 413. In a preferred embodiment, a full node 210 will append the new block Bn+1 to the blockchain 202. Next, the DL node will transmit the DL (e.g., the new blockchain) to the DL network.

According to the DL protocol of embodiments, upon successfully completing a PoW and integrating a new block into the DL, a reward is earned by the DL node. In FIG. 4, this is shown at step 415.

After the DL node obtains such a reward (or in anticipation of receiving the reward), it will execute step 416 and distribute a portion of the reward to the nodes which provided the verifications that were incorporated into the appended block. After distributing the reward, the process ends. In some embodiments, the distribution includes adding a transaction to the DL ledger indicating that a share of an asset is associated with the nodes that assisted in verification. In another embodiment, the distribution includes a reward that is not directly recorded in the DL, but rather is controlled or recorded by the DL node.

Figure 5A:
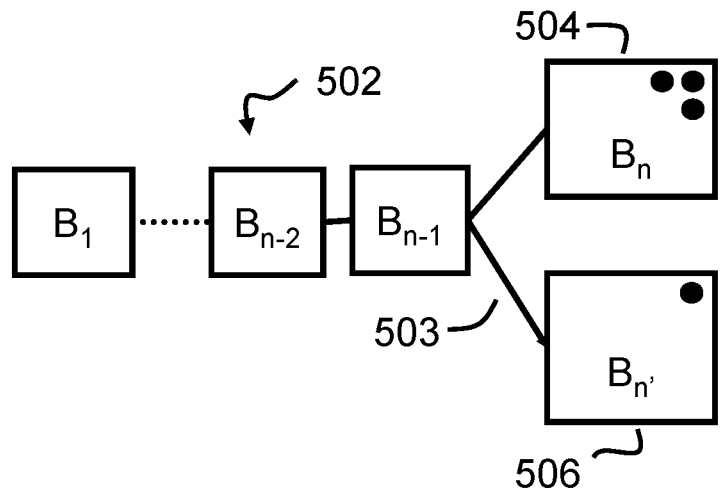
FIG. 5A illustrates a blockchain including a fork according to an embodiment.
Figure 5B:
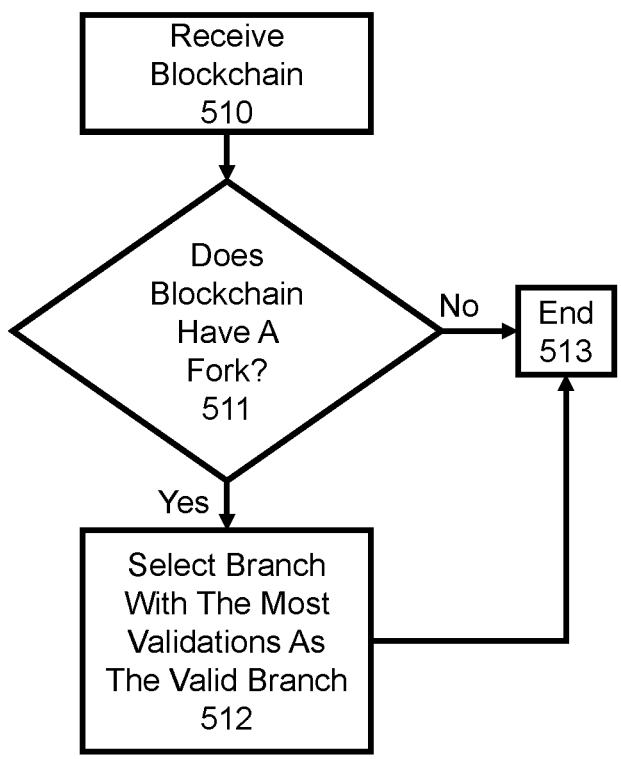
FIG. 5B illustrates a process for selecting a preferred branch of a fork in a blockchain according to an embodiment.

FIG. 5A illustrates a blockchain including a fork according to an embodiment. FIG. 5B illustrates a process for selecting a preferred fork in a blockchain according to an embodiment.

In blockchain systems, several blocks may exist on the same height of the blockchain (i.e. a fork may exist). As shown in FIG. 5A, the blockchain 502 has a fork 503. At the fork, there are two blocks 504 and 506 that exist at the same height Bn.

Preferably, a blockchain system determines which branch is preferred and discards the other branches (e.g., reaches consensus). In some embodiments, the branch that holds most verifications is preferred. For example, some embodiments enforce a tie-breaker rule for forks in the blockchain, where if several branches exist, the tie-breaker rule establishes that the valid branch is the branch that carries the most verifications. Some embodiments may also employ this rule in a proof of stake block chain regime, where forks and the "nothing at stake" attack are a concern.

In the blockchain 502, block 504 has the most verifications (in FIG. 5A verifications are represented by the dots in the corner). As such, according to embodiments of the invention, the branch that includes block 504 is the preferred branch.

A DL node according to embodiments of the invention may execute a fork preference process, such as the one illustrated in FIG. 5B. In step 510, the DL node receives a blockchain (e.g., blockchain 502). In step 511, the DL node determines whether the blockchain has a fork. If the blockchain has a fork, the DL will execute step 512, which will select the branch with the most validations as the valid (or preferred) branch. For example, if blockchain 502 was received, this process would select the branch with block 504 as the valid branch. If however, a fork is not detected in step 511, this process ends 513.

According to some embodiments, this branch selection process may be called as part of a process for verifying DL data. For example, the branch selection process may be called after step 301 in the process illustrated in FIG. 3 or after step 401 in the process illustrated in FIG. 4 to select the preferred branch for performing the rest of the process steps.

Trusted Execution Environments

In some embodiments, the verifier node includes a secure enclave for executing secure code. For example, referring back to FIG. 2, the processor 221 of verifier node 220 can include a secure enclave. In a preferred embodiment, the verifier node includes a trusted execution environment (TEE). The verifier node may produce a signature as a proof of successful verification of the transactions or blocks. The verification process, including the production of the signature is preferably executed within the secure enclave (e.g., a TEE).

A TEE is an isolated environment with strictly defined entry and exit mechanisms, provided by a processor. In some embodiments, INTEL processors or ARM processors may be used to implement the TEE. A TEE guarantees that code and data loaded inside the TEE will be protected with respect to confidentiality and integrity. The isolated instance of code running inside a TEE and its protected data is known as a trusted application. In some embodiments, the application for verifying the blockchain is a trusted application.

According to some embodiments, the trusted application executes one or more of the following steps: verifying the block (e.g., as described above) and producing a signature for incorporation into the block header of the verified block. According to some embodiments, the signature is a private signing key that only exists in a TEE. The trusted application may also execute the step of providing a certificate by the TEE manufacturer that shows that the signing key belongs to a TEE.

In one embodiment, the verification code is implemented using the INTEL 64 instruction set and INTEL Software Guard Extensions (SGX). SGX is an implementation of a TEE by INTEL, available on Skylake and later central processing units (CPUs). SGX allows application to run in secure containers called enclaves with dedicated memory regions that are secured with on-chip memory encryption. Access to the encrypted memory is mediated by the hardware, effectively excluding the OS or any other software from the Trusted Computing Base (TCB).

Privileged code on the platform can create and add data to an enclave with instructions ECREATE, EADD, EINIT. After creation, the enclave code can only be invoked using a thin interface via instructions EENTER and ERESUME while enclave code can return by calling the EEXIT instruction to make sure that any sensitive information is flushed before control is given back to the OS.

TEEs (such as SGX) may allow for remote attestation. Remote attestation allows for a remote party to verify that an expected piece of code runs in a trusted enclave (e.g., a trusted enclave on an SGX-enabled platform). Some attestation mechanisms use a Direct Anonymous Attestation (DAA) scheme that provides platform anonymity, i.e., the verifier is assured that the enclave runs on a trusted platform (e.g., an SGX platform) without being able to tell it apart from other trusted platforms. Remote attestation may be implemented as a two-step process. During the first step, the enclave to be attested proves its identity to a system enclave present on every platform and called quoting enclave. The latter has access to the DAA signing key and produces a publicly verifiable quote that allows the verifier to remotely attest the enclave. Attestation may include a mediation service (e.g., Intel Attestation Service, IAS) that mediates communication between quoting enclaves and remote verifiers. For example, the IAS only allows registered parties to issue remote attestation requests. Also, the quote produced by a quoting enclave may be encrypted under the mediation service's public key so that only the mediation service can proceed with the verification. The mediation services then signs a publicly verifiable statement to confirm that the enclave runs on a trusted platform.

Some embodiments of the current invention utilize TEEs (such as SGX). For example, in some embodiments transaction verification code is placed in the enclave of blockchain nodes (e.g., the verifier nodes). Different blockchain nodes may attest each other using a remote attestation process (e.g., the remote attestation process offered by INTEL SGX). If attestation succeeds, these nodes add the public keys of the attested enclaves in their whitelist. The whitelist may be stored on SGX. Whenever a new transaction arrives, each blockchain node passes the new transaction to its enclaves, and verifies the transaction. If the transaction verification is successful, the enclave adds its signature and sends it on the block chain system network.

In some embodiments, nodes receiving the transaction simply check that it has a correct signature of an attested enclave and do not need to check any further (for example if they trust the utilized TEE (e.g., INTEL SGX)).

Miners may include transactions that have correct signatures by attested enclaves and upon successful block generation, they give part of the transaction fees to the signing enclaves.

Remote attestation allows a claim to be made about the properties of a target by supplying evidence to an appraiser over a network. In some embodiments, the TEE supports a form of remote attestation. A remote party can use the TEE to identify an instance of a specific trusted application executing on an authentic hardware platform. Additionally, a secure communication channel can be established with the trusted application bound to the result of remote attestation.

Figure 6:
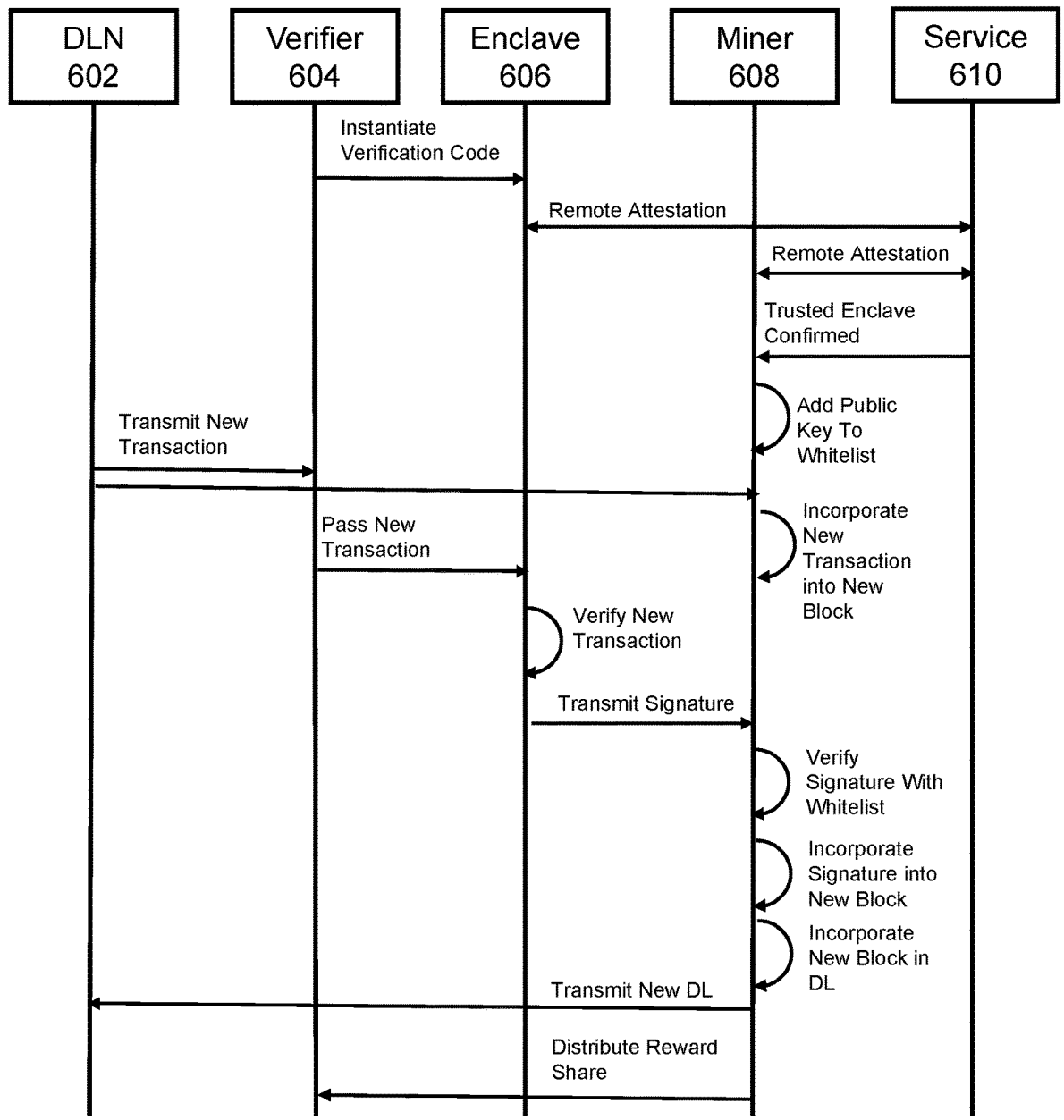
FIG. 6 illustrates an implementation of a protocol using a secure enclave in a DL system according to an embodiment.

FIG. 6 illustrates an implementation of a protocol using a secure enclave in a DL system. According to some embodiments, the secure enclave is a TEE. The verifier 604 instantiates verification code in a secure enclave 606. The verification code, according to some embodiments, is a trusted application. Different DL nodes may then attest each other using a remote attestation process. For example, in some embodiments, verifier 604 and miner 608 attest each other as illustrated in FIG. 6. Here, the enclave 606 of verifier 604 to be attested communicates to a service 610 to prove its identity and that it is running a trusted application (referring back to FIG. 2, the service 610 may be implemented at node 230). The service 610 may mediate communication between the enclave 606 and the miner 608 (which is a DL node, such as full node 210). After completing remote attestation process, the miner 608 will recognize signatures received from verifier 604 as trusted signatures. In the illustrated example, the service 610 confirms to the miner 608 that the enclave 606 is trusted. The miner 608 then adds a public key associated with the now trusted enclave 606 and the verifier 605 to a whitelist. Once the public key is in the whitelist, the miner 608 will now trust verifications that correspond to that public key.

As illustrated in FIG. 6, a new transaction may be transmitted over the DL network and received by the verifier 604 and the miner 608. The miner 608 may then incorporate the new transaction into a new block. In some embodiments this is performed according to the process illustrated in FIG. 4. The verifier 604 may pass the new transaction to its secure enclave 606. The trusted verification application will then execute in the secure enclave to determine whether the new transaction is valid. In some embodiments, the verification process is performed according to the process illustrated in FIG. 3. If the new transaction is verified, the enclave 606 will cause a verification signature to be transmitted to the miner 608. The miner 608 will check the verification signature against its whitelist, and if it is valid will incorporate the verification signature into the new block. Upon completing the appropriate DL protocol (e.g., a PoW), the miner 608 will incorporate the new block in to the DL and transmit the updated DL to the DLN 602. The miner 608 may then distribute a share of the reward for mining a new DL to the verifier 604 as a reward for verifying the new transaction.

Figure 7:
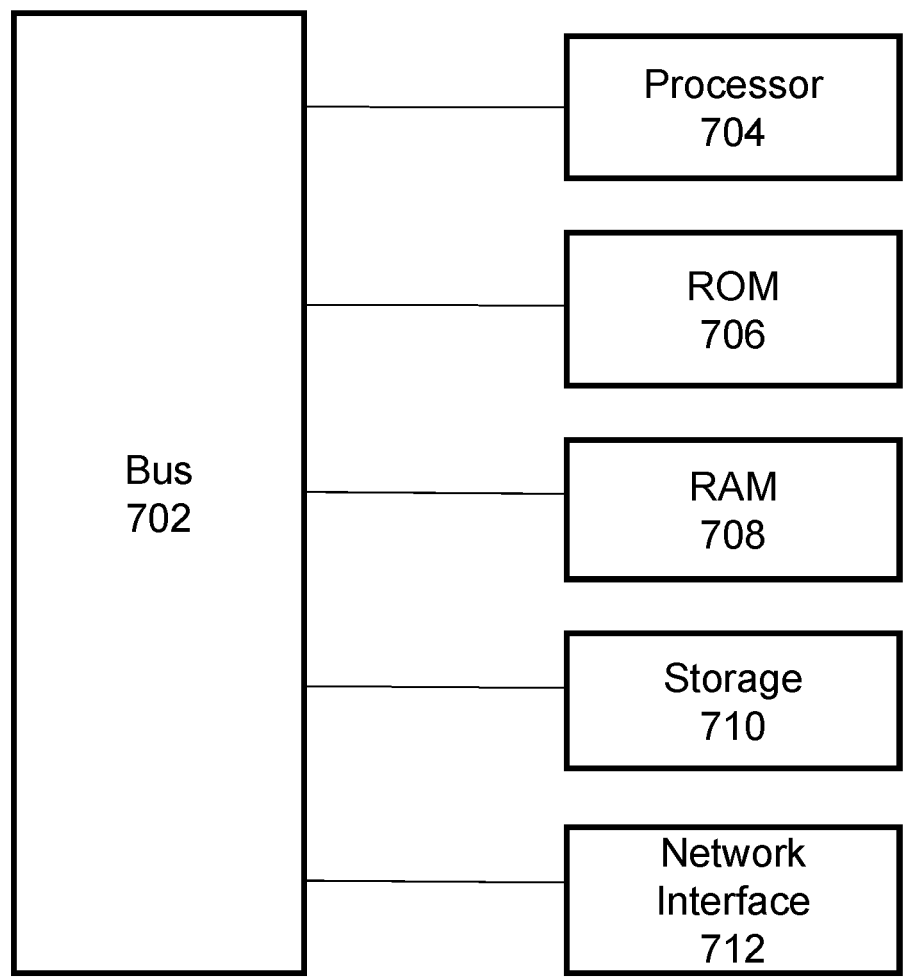
FIG. 7 illustrates a block diagram of a processing system according to an embodiment.

FIG. 7 is a block diagram of a processing system according to one embodiment. The processing can be used to implement the protocols, systems and nodes described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

Embodiments of the present invention provide robust and secure solutions which ensures that a full blockchain is verified frequently. For example, some embodiments require integrating confirmations (e.g., trusted verifications) into a blockchain and giving a reward to verifiers, which incentivizes verification of the blockchain. Additionally, using a trusted execution environment for verification, as described in some embodiments, ensures that verification of the blockchain is performed correctly and deters selfish mining. This solves a problem in many blockchain systems that only miners (e.g., mining pool operators or full nodes), are incentivized to verify the blockchain. Some embodiments also provide for a mechanism for selecting a preferred branch in blockchain by choosing the branch with the most verifications, which encourages consensus on a more robustly verified blockchain.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of executing a blockchain protocol to integrate a new block into a blockchain of a blockchain network, a the blockchain network comprising interconnected blockchain nodes comprising at least a first node and a second node, the method comprising:
  receiving, by the first node of the blockchain network from the second node of the blockchain network, verification data associated with a transaction, the verification data comprising a digital signature of the second node and the verification data representing that information contained in the transaction has been verified by the second node;
  evaluating the verification data, by the first node, to determine whether the verification data is trustworthy; and
  based on determining that the verification data is trustworthy, executing a consensus protocol, by the first node, integrating the transaction and the verification data together into the new block and adding the new block to the blockchain of the blockchain network;
  wherein evaluating the verification data comprises verifying, by the first node, that the verification data received from the second node was generated by a verification application executed in a secure enclave of the second node, and
  wherein evaluating the verification data comprises:
    receiving, by the first node, attestation data corresponding to the second node;
    determining, by the first node according to the attestation data, whether the second node executed the trusted verification application to generate the verification data;
    based on determining that the second node executed the trusted verification application to generate the verification data, determining that the verification data is trustworthy; and
    adding, by the first node, a public key corresponding to the digital signature of the second node to a whitelist based on the first node having determined that the second node is executing the trusted verification application.

2. The method according to claim 1, wherein the digital signature comprises a Software Guard Extensions (SGX) digital signature.

3. The method according to claim 1, further comprising providing, by the first node, a verification reward to the second node, wherein the verification reward comprises at least one of a digital asset, money, a transaction fee credit, or a transaction fee waiver.

4. The method according to claim 1, wherein the digital signature received by the first node was generated by a method comprising:
  determining whether the transaction is valid by performing at least one of:
    verifying a transaction signature of a transaction sender that transmitted the transaction on the blockchain network,
    tracing an amount of the transaction back in the blockchain so as to confirm that the transaction sender has sufficient resources to fulfill the transaction,
    verifying that an asset associated with the transaction has not been previously double-spent, or
    verifying at least one prior verification that was previously integrated into the blockchain is valid; and
  generating the digital signature based on the verification having been determined to be valid.

5. The method according to claim 1, further comprising:
  adding, by the first node, the new block to the blockchain; and
  receiving, by the first node, a new block reward for adding the new block to the block chain,
  providing, by the first node, a verification reward to the second node, wherein the verification reward comprises a share of the new block reward.

6. The method according to claim 1, wherein the blockchain comprises a fork into a plurality of branches, the method further comprising:
  selecting, by the first node, a branch of the plurality of branches having the most verifications as a valid branch of the blockchain.

7. A blockchain node of a blockchain network, the blockchain network comprising a plurality of interconnected blockchain nodes comprising at least the blockchain node and a second node, the blockchain node comprising one or more processors which, alone or in combination, are configured to execute a blockchain protocol to integrate a new block into a blockchain of the blockchain network, wherein executing the blockchain protocol comprises:
  receiving, from the second node of the blockchain network, verification data associated with a transaction, the verification data comprising a digital signature the second node and the verification data representing that information contained in the transaction has been verified by the second node;
  evaluating the verification data to determine whether the verification data is trustworthy; and
  based on determining the verification data is trustworthy, executing a consensus protocol integrating the transaction and the verification data together into the new block and adding the new block to the blockchain of the blockchain network;
  wherein evaluating the verification date comprises verifying that the verification data received from the second node was generated by a verification application executed in a secure enclave of the second node, and
  wherein evaluating the verification data comprises:
    receiving, by the first node, attestation data corresponding to the second node;
    determining, by the first node according to the attestation data, whether the second node executed the trusted verification application to generate the verification data;
    based on determining that the second node executed the trusted verification application to generate the verification data, determining that the verification data is trustworthy; and
    adding, by the first node, a public key corresponding to the digital signature of the second node to a whitelist based on the first node having determined that the second node is executing the trusted verification application.

8. The blockchain node according to claim 7, wherein the one or more processors, alone or in combination, are further configured to provide performance of the following steps as part of evaluating the verification data:
   receiving attestation data corresponding to the second node;
   determining, according to the attestation data, whether the second node executed the trusted verification application to generate the verification data;
   based on determining that the second node executed the trusted verification application to generate the verification data, determining that the verification data is trustworthy; and
   adding a public key corresponding to the digital signature of the second node to a whitelist based on it having been determined that the second node is executing the trusted verification application.

9. The blockchain node according to claim 8, wherein:
   the blockchain comprises a fork into a plurality of branches, and
   the one or more processors are further configured to select a branch of the plurality of branches comprising the most verifications as a valid branch of the blockchain.

10. The method according to claim 1, wherein the secure enclave is a trusted execution environment.

11. The method according to claim 1, wherein the first node is a mining node configured to execute the entire consensus protocol and the second node is a verifier node which is not configured to execute the entire consensus protocol.

12. The method according to claim 1, the method further comprising, the first node does not execute a verification process to verify the information contained in the transaction.

* * * * *